United States Patent
Lyu

(10) Patent No.: US 10,824,907 B2
(45) Date of Patent: Nov. 3, 2020

(54) SYSTEMS AND METHODS FOR IMAGE PROCESSING

(71) Applicant: SHANGHAI UNITED IMAGING HEALTHCARE CO., LTD., Shanghai (CN)

(72) Inventor: Chuanfeng Lyu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 159 days.

(21) Appl. No.: 16/022,866

(22) Filed: Jun. 29, 2018

(65) Prior Publication Data

US 2019/0180143 A1    Jun. 13, 2019

Related U.S. Application Data

(63) Continuation of application No. PCT/CN2018/090032, filed on Jun. 6, 2018.

(30) Foreign Application Priority Data

Dec. 7, 2017   (CN) .......................... 2017 1 1288530

(51) Int. Cl.
*G06K 9/00* (2006.01)
*G06K 9/62* (2006.01)
(Continued)

(52) U.S. Cl.
CPC ......... *G06K 9/6256* (2013.01); *G06K 9/6262* (2013.01); *G06N 3/08* (2013.01); *G06T 1/20* (2013.01)

(58) Field of Classification Search
None
See application file for complete search history.

(56) References Cited

U.S. PATENT DOCUMENTS

2010/0111408 A1* 5/2010 Matsuhira ............. G06T 3/4038
382/164
2013/0266214 A1   10/2013 Lillywhite et al.
(Continued)

FOREIGN PATENT DOCUMENTS

CN      106600538 A      4/2017
CN      106846261 A      6/2017
(Continued)

OTHER PUBLICATIONS

International Search Report in PCT/CN2018/090032 dated Aug. 31, 2016, 4 pages.
(Continued)

*Primary Examiner* — Delomia L Gilliard
(74) *Attorney, Agent, or Firm* — Metis IP LLC

(57) ABSTRACT

The disclosure relates to systems and methods for image processing. A trained deep learning model may be determined. An input image may be acquired. A processing result may be generated by processing the input image based on the trained deep learning model. The trained deep learning model may be obtained according to a process including: acquiring a preliminary deep learning model; acquiring a sample image; generating a plurality of sub-images based on the sample image; and training the preliminary deep learning model based on the plurality of sub-images to obtain the trained deep learning model.

20 Claims, 11 Drawing Sheets

(51) Int. Cl.
*G06N 3/08* (2006.01)
*G06T 1/20* (2006.01)

(56) References Cited

U.S. PATENT DOCUMENTS

| | | | |
|---|---|---|---|
| 2016/0174902 A1* | 6/2016 | Georgescu | G06T 7/73 |
| | | | 600/408 |
| 2017/0270387 A1 | 9/2017 | Kulkarni et al. | |
| 2017/0277981 A1* | 9/2017 | Zhou | G06T 7/143 |
| 2019/0114511 A1* | 4/2019 | Gao | G06N 3/084 |
| 2019/0206085 A1 | 7/2019 | Jiang | |
| 2019/0266448 A1* | 8/2019 | Thiruvenkadam | G06K 9/6271 |

FOREIGN PATENT DOCUMENTS

| | | |
|---|---|---|
| CN | 106991420 A | 7/2017 |
| CN | 107358262 A | 11/2017 |
| CN | 107368886 A | 11/2017 |
| CN | 107832807 A | 3/2018 |

OTHER PUBLICATIONS

Written Opinion in PCT/CN2018/090032 dated Aug. 31, 2018, 5 pages.

Trac D. Tran et al., Lapped Transform via Time-Domain Pre- and Post-filtering, IEEE Transactions on Signal Processing, 51(6): 1557-1571, 2003.

* cited by examiner

SYSTEMS AND METHODS FOR IMAGE PROCESSING

CROSS-REFERENCE TO RELATED APPLICATIONS

This present application is a continuation of International Application No. PCT/CN2018/090032, filed on Jun. 6, 2018, which claims priority to Chinese Patent Application No. 201711288530.0, filed on Dec. 7, 2017, the entire contents of which are hereby incorporated by reference.

TECHNICAL FIELD

The present disclosure generally relates to image processing, and more particularly, to systems and methods for training a deep learning model for image processing.

BACKGROUND

A deep learning model may be used in image processing. For example, a deep learning model may be employed in image segmentation, image classification, image recognition. The deep learning model may be trained before image processing. The deep learning model may be trained based on one or more sample images. Therefore, it is desirable to develop systems and methods for training a deep learning model based on sample image(s) with a relatively large size in a graphics processing unit (GPU).

SUMMARY

In one aspect of the present disclosure, a method is provided. The method may be implemented on at least one machine each of which has at least one processor and at least one storage device. The method may include one or more of determining a trained deep learning model, acquiring an input image, and generating a processing result by processing the input image based on the trained deep learning model. The trained deep learning model may be obtained according to a process. The process may include one or more of acquiring a preliminary deep learning model, acquiring a sample image, generating a plurality of sub-images based on the sample image, and training the preliminary deep learning model based on the plurality of sub-images to obtain the trained deep learning model.

In another aspect of the present disclosure, a system is provided. The system may include at least one processor and a storage configured to store instructions, wherein when executing the instructions, the at least one processor may be configured to cause the system to determine a trained deep learning model, acquire an input image, and generate a processing result by processing the input image based on the trained deep learning model. The trained deep learning model may be obtained according to a process. The process may include one or more of acquiring a preliminary deep learning model, acquiring a sample image, generating a plurality of sub-images based on the sample image, and training the preliminary deep learning model based on the plurality of sub-images to obtain the trained deep learning model.

In yet another aspect of the present disclosure, a non-transitory computer-readable medium is provided. The non-transitory computer-readable medium may be configured to store instructions, the instructions, when executed by at least one processor, causing the at least one processor to implement a method. The method may include one or more of determining a trained deep learning model, acquiring an input image, and generating a processing result by processing the input image based on the trained deep learning model. The trained deep learning model may be obtained according to a process. The process may include one or more of acquiring a preliminary deep learning model, acquiring a sample image, generating a plurality of sub-images based on the sample image, and training the preliminary deep learning model based on the plurality of sub-images to obtain the trained deep learning model.

In yet another aspect of the present disclosure, a system is provided. The system may include at least one processor and a storage configured to store instructions. The system may further include one or more of a model determination module configured to determine a trained deep learning model, a data acquisition module configured to acquire an input image, a preliminary deep learning model, and a sample image, an image processing module configured to generate a processing result by processing the input image based on the trained deep learning model, a sub-image generation unit configured to generate a plurality of sub-images based on the sample image, and a model training unit configured to train the preliminary deep learning model based on the plurality of sub-images to obtain the trained deep learning model.

In some embodiments, at least two of the plurality of sub-images may share a same portion of the sample image.

In some embodiments, the generation of a plurality of sub-images based on the sample image may include one or more of determining a width of the same portion, determining a size of each of the plurality of sub-images or the number of the sub-images, and generating the plurality of sub-images based on the width of the same portion, and at least one of the size of each of the plurality of sub-images or the number of the sub-images.

In some embodiments, the preliminary deep learning model may include at least one convolutional neural network (CNN). The at least one CNN may include at least one kernel. The determination of a width of the same portion may include determining the width of the same portion of the sample image based on a size of the at least one kernel.

In some embodiments, the determination of a width of the same portion of the sample image may include determining the number of pixels or voxels corresponding to the width of the same portion of the sample image as no less than a reference value R. The reference value R may be related to at least one of a width of the at least one kernel or the number of at least one down sampling layer that includes the at least one kernel.

In some embodiments, the generation of the plurality of sub-images based on the sample image may further include performing a data extension on the sample image or one or more of the plurality of sub-images along one or more directions to obtain extended data. A width of pixels/voxels corresponding to the extended data may be no less than half of the reference value R.

In some embodiments, the reference value R may be determined as $$\begin{cases} R = 2S_N, & N = 1 \\ R = 2S_1(1 + P_1), & N > 1 \end{cases},$$

and wherein $P_i$ may be equal to $S_{i+1}(1+P_{i+1})$, i may be an integer larger than 1, N may be the number of the down sampling layers that includes one or more kernels, the $N^{th}$ layer may be the output layer, $P_{N-1}$ may be equal to $S_N$, $S_j$ may be equal to $(W_j-1)/2$, j may be an integer larger than 1, and $W_j$ may denote the maximum width of the kernel(s) in the $j^{th}$ layer.

In some embodiments, the plurality of sub-images may include a first sub-image, a second sub-image, and a third sub-image. The first sub-image and the second sub-image may share a first same portion. The first sub-image and the third sub-image may share a second same portion.

In some embodiments, the first same portion may have a first width same to a second width of the second same portion.

In some embodiments, the training of the preliminary deep learning model may include training the preliminary deep learning model by a graphic processing unit (GPU).

In some embodiments, the training of the preliminary deep learning model by a GPU may include one or more of loading a first sub-image into the GPU, training the preliminary deep learning model using the first sub-image to obtain an updated deep learning model, loading a second sub-image into the GPU, and training the updated deep learning model using the second sub-image to obtain a trained deep learning model.

In some embodiments, the determination of a size of each of the plurality of sub-images or the number of the sub-images may include determining the size of each of the plurality of sub-images or the number of the sub-images based on a size of the sample image and available memory space of the GPU.

In some embodiments, the processing of the input image based on the trained deep learning model may include segmenting the input image. The processing result may include a segmented image based on the segmentation.

In some embodiments, at least two of the plurality of sub-images may have a same size.

In some embodiments, the plurality of sub-images may have a same size.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 10A and 10B are diagrams illustrating exemplary hardware test information relating to a GPU according to some embodiments of the present disclosure.

DETAILED DESCRIPTION

Figure 1A:
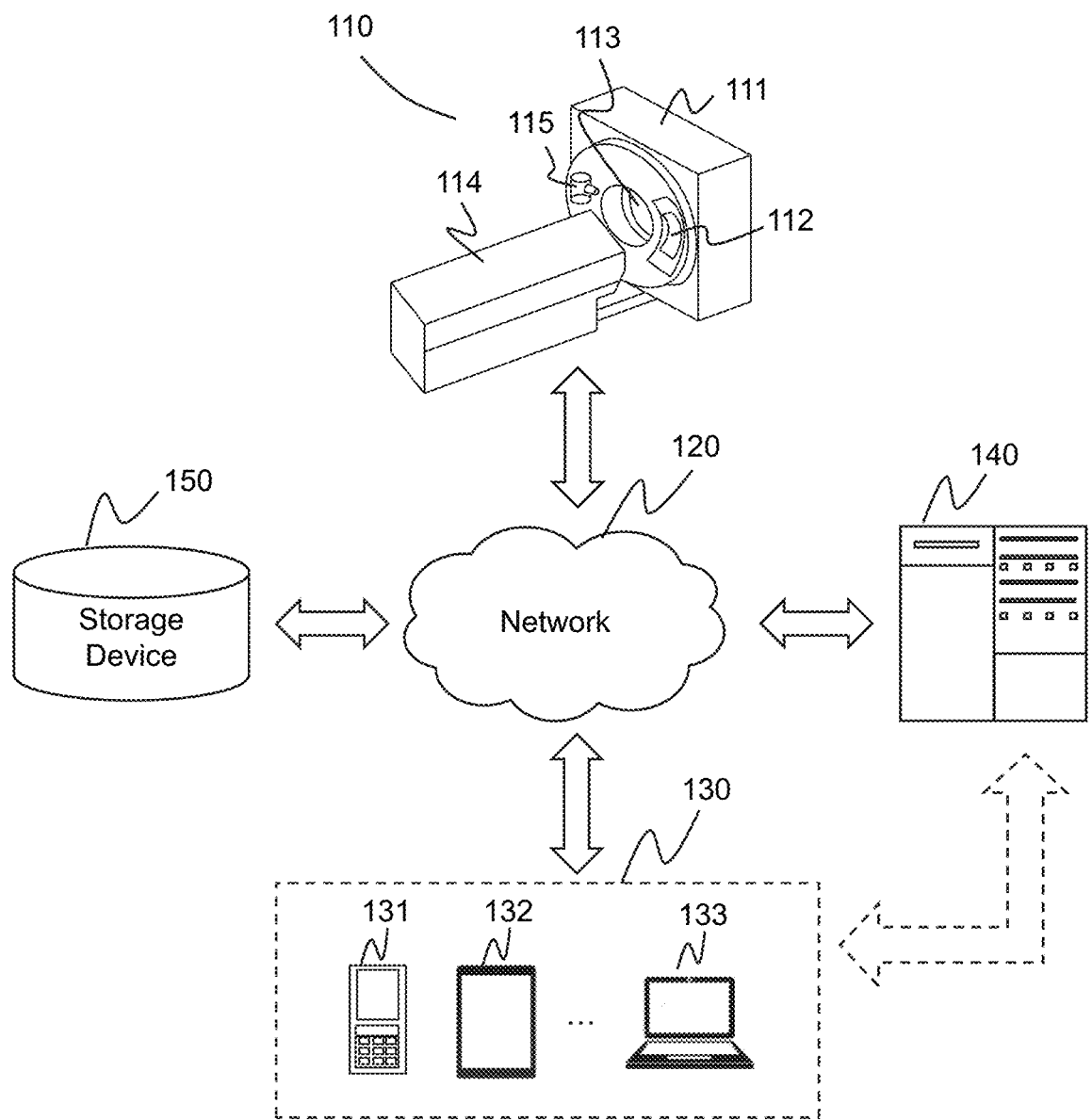
FIGS. 1A and 1B are schematic diagrams illustrating an exemplary imaging system according to some embodiments of the present disclosure.

In the following detailed description, numerous specific details are set forth by way of example in order to provide a thorough understanding of the relevant application. However, it should be apparent to those skilled in the art that the present application may be practiced without such details. In other instances, well-known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG.

2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, module or block is referred to as being "on," "connected to," "communicate with," "coupled to" another unit, module, or block, it may be directly on, connected or coupled to, or communicate with the other unit, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the target region may be an organ, texture, an object, a lesion, a tumor, or the like, or any combination thereof. Merely by way for example, the target region may include a head, a breast, a lung, a rib, a vertebra, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the image may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

For brevity, an image, or a portion thereof (e.g., a region of interest (ROI) in the image) corresponding to an object (e.g., a tissue, an organ, a tumor of a subject (e.g., a patient) may be referred to as an image, or a portion of thereof (e.g., an ROI) of or including the object, or the object itself. For instance, an ROI corresponding to the image of a rib may be described as that the ROI includes a rib. As another example, an image of or including a rib may be referred to a rib image, or simply a rib. For brevity, that a portion of an image corresponding to an object is processed (e.g., extracted, segmented) may be described as the object is processed. For instance, that a portion of an image corresponding to a rib is extracted from the rest of the image may be described as that the rib is extracted.

An aspect of the present disclosure relates to a system and method of training a deep learning model for image processing (e.g., image segmentation). To train a deep learning model, the system may acquire a preliminary deep learning model, acquire at least one sample image, generate a plurality of sub-images based on the at least one sample image, train the preliminary deep learning model using the plurality of sub-images to obtain a trained deep learning model. Each sub-image may have the same portion of the sample image(s) as one or more other sub-images. The sub-images may be generated based on a determined width of the same portion and a determined number of the sub-images (or a determined size of each sub-image).

For illustration purposes, the following description is provided with reference to a training process to obtain a trained deep learning model. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Figure 1B:
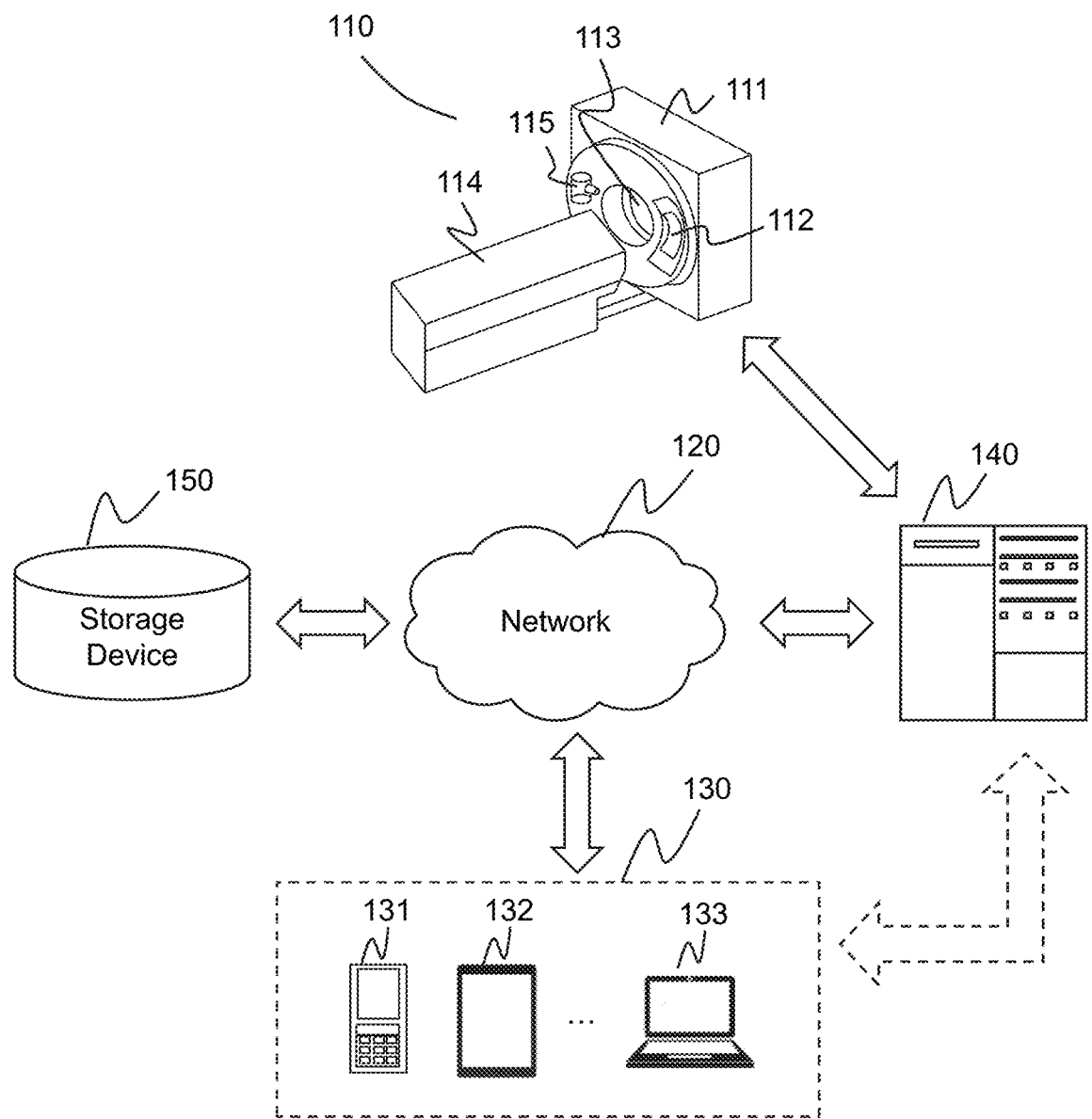

FIGS. 1A and 1B are schematic diagrams illustrating an exemplary imaging system according to some embodiments of the present disclosure. As shown in FIG. 1, the imaging system 100 may include a scanner 110, a network 120, one or more terminals 130, a processing device 140, and a storage device 150. The components of the imaging system 100 may be connected in one or more of variable ways. Merely by way of example, as illustrated in FIG. 1A, the scanner 110 may be connected to the processing device 140 through the network 120. As another example, as illustrated in FIG. 1B, the scanner 110 may be connected to the processing device 140 directly. As a further example, the storage device 150 may be connected to the processing device 140 directly or through the network 120. As still a further example, a terminal 130 may be connected to the processing device 140 directly or through the network 120.

The scanner 110 may scan an object and generate scanned data relating to the object. In some embodiments, the scanner 110 may be a medical imaging device, for example, a PET device, a SPECT device, a CT device, an MRI device, or the like, or any combination thereof (e.g., a PET-CT device, a PET-MRI device, or a SPECT-MRI device). The scanner 110 may include a gantry 111, a detector 112, a detecting region 113, and a table 114. In some embodiments, the scanner 110 may also include a radioactive scanning source 115. The gantry 111 may support the detector 112 and the radioactive scanning source 115. An object may be placed on the table 114 for scanning. In the present disclosure, "object" and "subject" are used interchangeably. The radioactive scanning source 115 may emit radioactive rays to the object. In some embodiments, the detector 112 may detect radiation events (e.g., gamma photons) emitted from the detecting region 113. In some embodiments, the scanner 110 may be an MRI scanning device, and the detector 112 may include an electric circuit for detecting and/or receiving radiofrequency (RF) signals.

The network 120 may include any suitable network that can facilitate the exchange of information and/or data for the imaging system 100. In some embodiments, one or more components of the imaging system 100 (e.g., the scanner 110, the terminal 130, the processing device 140, the storage device 150) may communicate information and/or data with one or more other components of the imaging system 100 via the network 120. For example, the processing device 140 may obtain image data from the scanner 110 via the network 120. As another example, the processing device 140 may obtain user instructions from the terminal 130 via the network 120. The network 120 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™. In some embodiments, the terminal(s) 130 may be part of the processing device 140.

Figure 2:
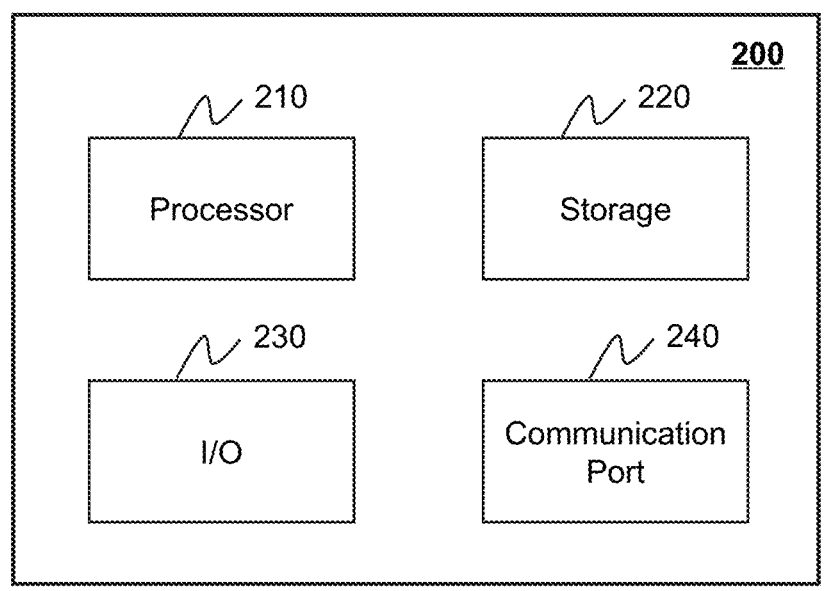
FIG. 2 is a schematic diagram illustrating exemplary hardware and/or software components of a computing device on which the processing device may be implemented according to some embodiments of the present disclosure.

The processing device 140 may process data and/or information obtained from the scanner 110, the terminal 130, and/or the storage device 150. In some embodiments, the processing device 140 may be a single server or a server group. The server group may be centralized or distributed. In some embodiments, the processing device 140 may be local or remote. For example, the processing device 140 may access information and/or data stored in the scanner 110, the terminal 130, and/or the storage device 150 via the network 120. As another example, the processing device 140 may be directly connected to the scanner 110, the terminal 130, and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. In some embodiments, the processing device 140, or a portion of the processing device 140 may be integrated into the scanner 110.

The storage device 150 may store data, instructions, and/or any other information. In some embodiments, the storage device 150 may store data obtained from the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components of the imaging system 100 (e.g., the processing device 140, the terminal 130). One or more components of the imaging system 100 may access the data or instructions stored in the storage device 150 via the network 120. In some embodiments, the storage device 150 may be directly connected to or communicate with one or more other components of the imaging system 100 (e.g., the processing device 140, the terminal 130). In some embodiments, the storage device 150 may be part of the processing device 140.

FIG. 2 is a schematic diagram illustrating exemplary hardware and/or software components of a computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

In some embodiments, a GPU (not shown) in the processor 210 may be configured for graphics processing. The GPU may include one or more raster operation units (ROPs), a bus interface, one or more shaders, or the like. The GPU may include one or more electronic circuits to accelerate the creation of one or more images in a frame buffer intended for output to a display device (e.g., a display device of the I/O 230). In some embodiments, the GPU may perform graphics processing in one or more training processes for training a deep learning model. The GPU may perform one or more convolution operations (e.g., multiple matrix multiplications) involved in the training process(es). Exemplary producers of GPU may include NVIDIA, Intel, AMD, etc. It should be noted that the terms "graphics processing" and "image processing" in the present disclosure are different. Image processing may refer to an overall process for processing one or more images (e.g., image segmentation, image classification, image identification, image registration, image fusion). Graphics processing, as mentioned above, may include one or more convolution operations used in training a deep learning model with one or more images. In some embodiments, graphics processing may be a part of deep learning model training. In some embodiments, graphics processing may be a part of image processing based on a deep learning model.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors.

The storage 220 may store data/information obtained from the scanner 110, the terminal 130, the storage device 150, and/or any other component of the imaging system 100. In some embodiments, the storage 220 may include a mass storage, removable storage, a volatile read-and-write memory, a read-only memory (ROM), or the like, or any combination thereof. Exemplary mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for determining a regularization item.

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
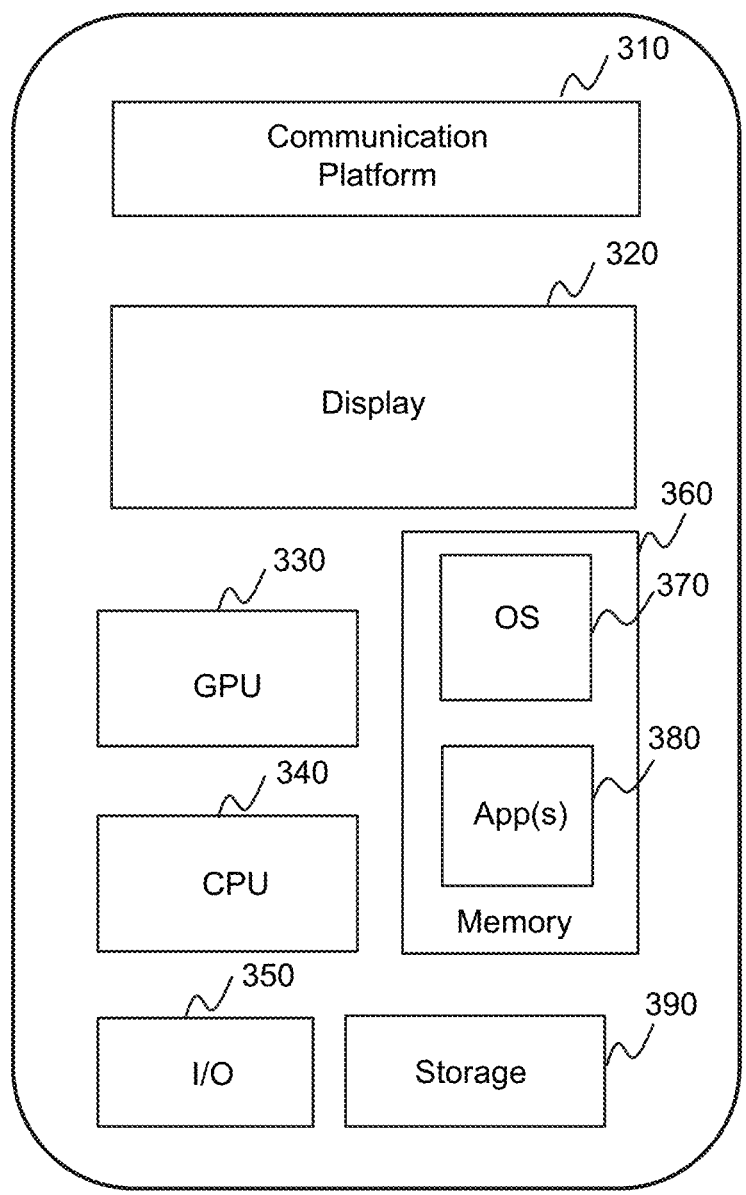
FIG. 3 is a schematic diagram illustrating exemplary hardware and/or software components of a mobile device on which the terminal may be implemented according to some embodiments of the present disclosure.

FIG. 3 is a schematic diagram illustrating exemplary hardware and/or software components of a mobile device 300 on which the terminal 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

In some embodiments, the GPU 330 may be configured for graphics processing. The GPU 330 may include one or more raster operation units (ROPs), a bus interface, one or more shaders, or the like. The GPU 330 may include one or more electronic circuits to accelerate the creation of one or more images in a frame buffer intended for output to a display device (e.g., the display 320). In some embodiments, the GPU 330 may perform graphics processing in one or more training processes for training a deep learning model. The GPU 330 may perform one or more convolution operations (e.g., multiple matrix multiplications) involved in the training process(es). Exemplary producers of the GPU 330 may include NVIDIA, Intel, AMD, etc.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
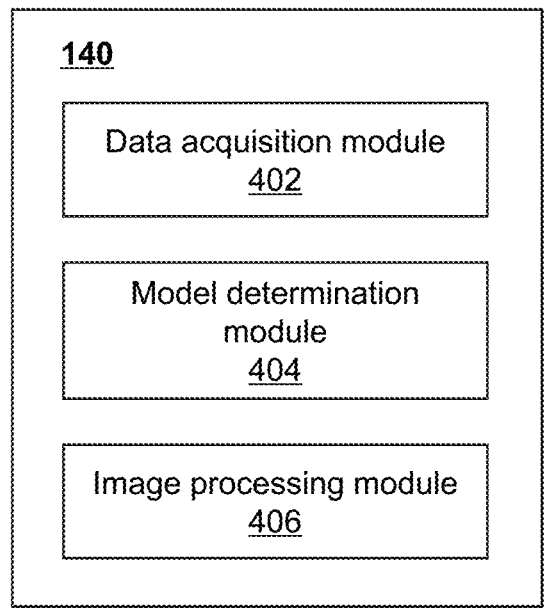
FIG. 4A is a schematic diagram illustrating an exemplary processing device according to some embodiments of the present disclosure.

FIG. 4A is a schematic diagram illustrating an exemplary processing device according to some embodiments of the present disclosure. The processing device 140 may include a data acquisition module 402, a model determination module 404, and an image processing module 406. At least a portion of the processing device 140 may be implemented on a computing device 200 as illustrated in FIG. 2 or a mobile device 300 as illustrated in FIG. 3.

The data acquisition module 402 may acquire data. The data may include image data, one or more instructions for processing the image data, or one or more parameters for processing the image data, or data relating to a performance status of one or more components (e.g., the processing device 140) of the imaging system 100. For example, the data acquisition module 402 may acquire data relating to available memory space of a GPU of the computing device 200 as illustrated in FIG. 2 or the GPU 330 of the mobile device 300 as illustrated in FIG. 3. In some embodiments, the data acquisition module 402 may acquire the image data from an internal data source of the imaging system 100 (e.g., the scanner 110 or the storage device 150) or an external data source connected to the imaging system 100 via the network (e.g., a database located on a cloud platform).

The image data may relate to an object. In some embodiments, the image data may be generated by a full scanning of an entire body of the object, and the generated image data may include information relating to the entire body of the object. In some embodiments, the image data may be generated by scanning one or more portions of the object, and the generated image data may include information relating to the one or more portions of the object. The one or more portions may include a chest, a trunk, an upper limb, a lower limb, a head, an organ, tissue, etc. The image data may be 2D image data or 3D image data. The 3D image data may include a plurality of voxels. The 2D image data may include a plurality of pixels. The image data may include MRI image data, CT image data, X-ray image data, ultrasonic image data, PET image data, or the like, or any combination thereof. The image data may include original data generated by the scanner 110, the image generated based on the original data, parameters for image generation, or the like, or a combination thereof. In some embodiments, the image data may include training data relating to one or more sample images. The data acquisition module 402 may transmit the training data to one or more other modules (e.g., the model determination module 404) or one or more units (e.g., the model training unit illustrated in FIG. 5A) of the processing device 140 for further processing.

The model determination module 404 may determine one or more models (e.g., one or more trained deep learning models). In some embodiments, the model determination module 404 may determine the trained deep learning model by training a deep learning model based on training data. In some embodiments, a deep learning model may include one or more deep neural networks (DNNs). In some embodiments, a DNN may include a multi-layer structure. In some embodiments, the model determination module 404 may make the deep learning model learn one or more features of the training data and adjust one or more layers (or one or more parameters) of the multi-layer structure. For image processing, the training data may relate to one or more sample images. In some embodiments, if the sample image(s) have relatively large size, the model determination module 404 may generate a plurality of sub-images based on the sample image(s) and obtain the training data corresponding to the sub-images. In some embodiments, the trained deep learning model may be generated by one or more other processors inside and/or outside of the imaging system 100, and the model determination module 404 may directly obtain the trained deep learning model. In some embodiments, the model determination module 404 may include one or more units, as described in FIG. 5A.

The image processing module 406 may process one or more images. In some embodiments, the image processing module 406 may process the image(s) based on a trained deep learning model. For example, the image processing module 406 may bring an image (e.g., an input image) into a trained deep learning model, process the input image on one or more (e.g., all) layers of a multi-layer structure in the trained deep learning model, and generate a processing result. The image processing module 406 may process the input image based on one or more algorithms in the trained deep learning model. The processing may include image segmentation, image classification, image recognition, image quality improvement, or the like, or any combination thereof. For example, in some embodiments, the input image may include a region of interest (ROI), and the image processing module 406 may segment or extract the ROI from the input image based on the trained deep learning model. As another example, the image processing module 406 may determine a preset group that the input image belongs to, based on the trained deep learning model. As a further example, the input image may include an ROI (e.g., a human face), and the image processing module 406 may recognize a person who owns the ROI based on the trained deep learning model. As still a further example, the input image may be an image with relatively low quality, and the image processing module 406 may improve the image quality based on the trained deep learning model.

Figure 4B:
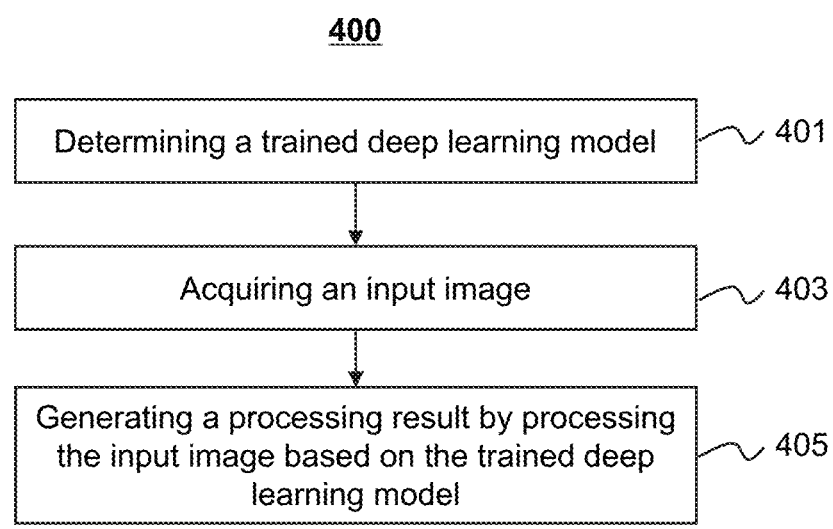
FIG. 4B is a flowchart illustrating an exemplary process for processing an input image according to some embodiments of the present disclosure.

FIG. 4B is a flowchart illustrating an exemplary process for processing an input image according to some embodiments of the present disclosure. In some embodiments, one or more operations of process 400 illustrated in FIG. 4B for processing an input image may be implemented in the imaging system 100 illustrated in FIG. 1. For example, the process 400 illustrated in FIG. 4B may be stored in the storage device 150 in the form of instructions, and invoked and/or executed by the processing device 140 (e.g., the processor 210 of the computing device 200 as illustrated in FIG. 2, the CPU 340 of the mobile device 300 as illustrated in FIG. 3). As another example, a portion of the process 400 may be implemented on the scanner 110. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 4B and described below is not intended to be limiting.

In 401, the processing device 140 (e.g., the model determination module 404) may determine a trained deep learning model. A deep learning model may include one or more algorithms used for generating an output result (e.g., an image processing result) based on input image data. In some embodiments, a deep learning model may include one or more deep neural networks (DNN), one or more deep Boltzmann machines (DBM), one or more stacked auto encoders, one or more deep stacking networks (DSN), etc. A DNN may include a convolution neural network (CNN), a recurrent neural network (RNN), a deep belief network (DBN), etc. In some embodiments, a DNN may include a multi-layer structure. A trained deep learning model may refer to a deep learning model that has been trained using training data (e.g., one or more sample images). The trained deep learning model may include one or more relatively optimized parameters relating to the algorithms (e.g., the DNN) of the deep learning model, so that the accuracy of image processing based on the trained deep learning model may meet a requirement of practical use. In some embodiments, the model determination module 404 may determine the trained deep learning model by training a deep learning model based on training data. In some embodiments, the model determination module 404 may make the deep learning model learn one or more features of the training data and adjust one or more layers (or one or more parameters) of the multi-layer structure. In some embodiments, if the sample image(s) have relatively large size, the model determination module 404 may generate a plurality of sub-images based on the sample image(s) and obtain the training data corresponding to the sub-images. In some embodiments, the trained deep learning model may be generated by one or more other processors inside and/or outside of the imaging system 100, and the model determination module 404 may directly obtain the trained deep learning model. More descriptions of the determination of the trained deep learning model may be found elsewhere in the present disclosure (e.g., FIGS. 5B and 7, and the descriptions thereof).

In 403, the processing device 140 (e.g., the data acquisition module 402) may acquire an input image. In some embodiments, operation 403 may be performed before operation 401. In some embodiments, the input image may have a similar level of size as at least one of the sample image(s) used for training the deep learning model. In some embodiments, the data acquisition module 402 may acquire the input image from the scanner 110, the storage device 150, and/or the terminal 130 of the imaging system 100. In some embodiments, the data acquisition module 402 may acquire the input image from the I/O 230 of the computing device 200 via the communication port 240, and/or the I/O 350 of the mobile device 300 via the communication platform 310. In some embodiments, the data acquisition module 402 may acquire the input image from an external data source connected to the imaging system 100 via the network 120. One or more processors inside and/or outside of the imaging system 100 may pre-process the input image before and/or after the data acquisition module 402 acquires the input image. The pre-processing may include image normalization, image reconstruction, image smoothing, suppressing, weakening, noise reducing, detail reducing, mutation (e.g., a gray level mutation) reducing, resizing, or the like, or any combination thereof. For example, the input image may be resized to a prescribed scale in pre-processing. The prescribed scale may be larger or smaller than an original scale of the input image.

In 405, the processing device 140 (e.g., the image processing module 406) may generate a processing result by processing the input image based on the trained deep learning model determined in 401. The image processing module 406 may bring the input image into the trained deep learning model, process the input image in one or more (e.g., all) layers of a multi-layer structure in the trained deep learning model, and/or generate the processing result. The image processing module 406 may process the input image based on one or more algorithms in the trained deep learning model. The processing may include image segmentation, image classification, image recognition, image quality improvement, or the like, or any combination thereof. For example, in some embodiments, the input image may include a region of interest (ROI), and the image processing module 406 may segment or extract the ROI from the input image based on the trained deep learning model. For image segmentation, the processing result may include a segmented image (e.g., an image including one or more segmented ribs) based on the segmentation. As another example, the image processing module 406 may determine a preset group that the input image belongs to, based on the trained deep learning model. As a further example, the input image may include an ROI (e.g., a human face), and the image processing module 406 may recognize a person who owns the ROI based on the trained deep learning model. As still a further example, the input image may be an image with relatively low quality, and the image processing module 406 may improve the image quality based on the trained deep learning model.

Figure 5A:
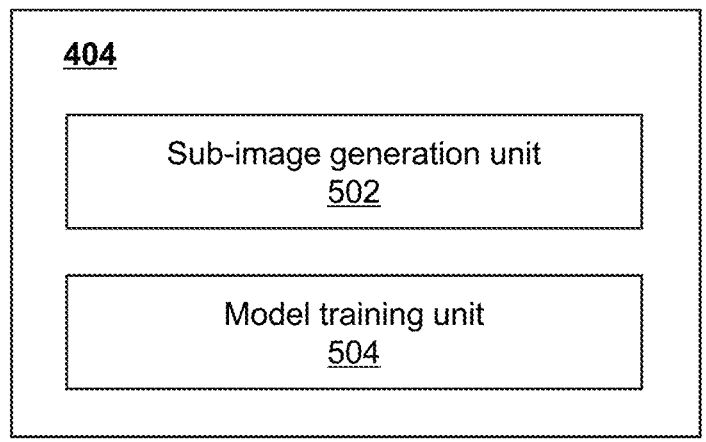
FIG. 5A is a block diagram illustrating an exemplary model determination module according to some embodiments of the present disclosure.

FIG. 5A is a block diagram illustrating an exemplary model determination module according to some embodiments of the present disclosure. The model determination module 404 may include a sub-image generation unit 502 and a model training unit 504. At least a portion of the model determination module 404 may be implemented on a computing device 200 as illustrated in FIG. 2 or a mobile device 300 as illustrated in FIG. 3.

The sub-image generation unit 502 may generate a plurality of sub-images based on one or more sample image(s). In some embodiments, a sub-image may have one or more same portions of a sample image as one or more other sub-images. The same portion(s) shared by two or more sub-images may ensure that every pixel/voxel in the sample image(s) can be involved in the subsequent training process(es). The sub-image generation unit 502 may generate the sub-images based on a determined width of the same portion, a determined number of the sub-images, and/or a determined size of each sub-image. In some embodiments, at least two of the plurality of sub-images may have the same size. In some embodiments, the plurality of sub-images may have the same size.

The model training unit 504 may train one or more models (e.g., one or more deep learning models). In some embodiments, the model training unit 504 may train the model(s) using a plurality of sub-images to obtain a trained deep learning model. The model training unit 504 may bring the sub-images into a preliminary deep learning model and train the preliminary deep learning model. In some embodiments, the model training unit 504 may perform one or more training processes until all the sub-images are used for training. In some embodiments, the model training unit 504 may generate an updated deep learning model in each training process. For example, the model training unit 504 may bring one or more of the sub-images into the preliminary deep learning model at one time for a first training process to generate a first updated deep learning model, and then the model training unit 504 may bring one or more other sub-images into the first updated deep learning model at one time for a second training process to generate a second updated deep learning model. It should be noted that the number of the training processes is merely provided for the purposes of illustration, and not intended to limit the scope of the present disclosure.

Figure 5B:
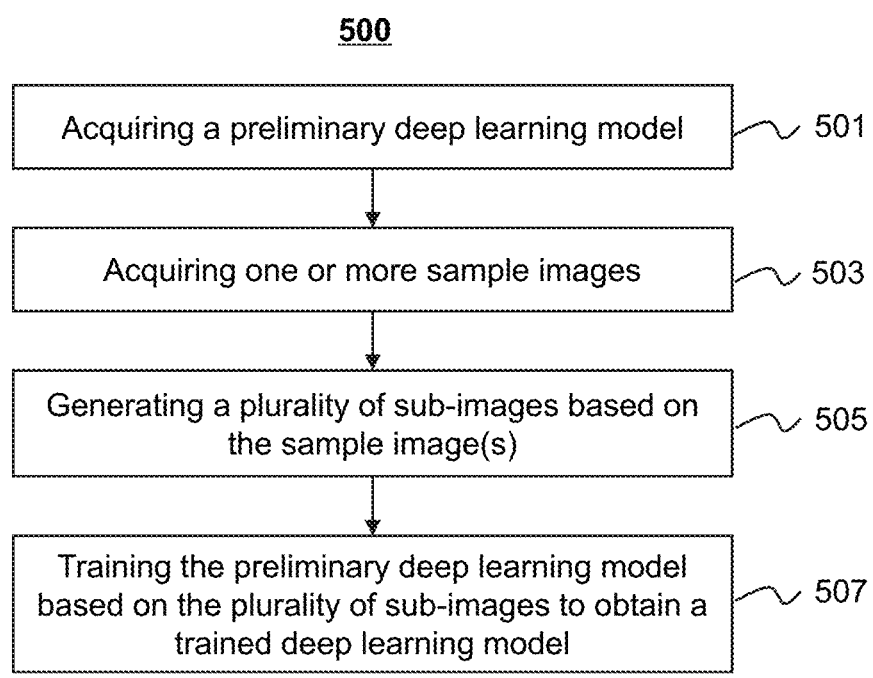
FIG. 5B is a flowchart illustrating an exemplary process for determining a trained deep learning model according to some embodiments of the present disclosure.

FIG. 5B is a flowchart illustrating an exemplary process for determining a trained deep learning model according to some embodiments of the present disclosure. In some embodiments, one or more operations of process 500 illustrated in FIG. 5B for determining a trained deep learning model may be implemented in the imaging system 100 illustrated in FIG. 1. For example, the process 500 illustrated in FIG. 5B may be stored in the storage device 150 in the form of instructions, and invoked and/or executed by the processing device 140 (e.g., the processor 210 of the computing device 200 as illustrated in FIG. 2, the CPU 340 of the mobile device 300 as illustrated in FIG. 3). As another example, a portion of the process 500 may be implemented on the scanner 110. In some embodiments, one or more operations of the process 500 may be performed by one or more processors inside and/or outside of the imaging system 100. For example, operation 507 may be performed by a processor outside of the imaging system 100. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5B and described below is not intended to be limiting.

In 501, the processing device 140 (e.g., the data acquisition module 402) may acquire a preliminary deep learning model. In some embodiments, operation 501 may be performed after operation 503 and/or operation 505. A preliminary deep learning model may refer to a deep learning model to be trained. The preliminary deep learning model may include a multi-layer structure. The preliminary deep learning model may include one or more deep neural networks, for example, deep belief networks, convolutional neural networks, convolutional deep belief networks, deep Boltzmann machines, stacked auto-encoders, deep stacking networks, deep coding networks, deep kernel machines, or the like, or any combination thereof. The preliminary deep learning model may include one or more model parameters. In some embodiments, the model parameter(s) may have one or more initial values. In some embodiments, the initial values of the model parameter(s) may be default values determined by the imaging system 100 or preset by a user or operator via the terminal(s) 130. In some embodiments, the data acquisition module 402 may acquire the initial values from the storage device 150, the terminal 130, and/or an external data source (not shown).

Merely by way of example, the preliminary deep learning model may include a preliminary convolutional neural network (CNN). The preliminary deep learning model may include one or more preliminary convolution layers. A preliminary convolution layer may include one or more kernels and one or more activation functions. A kernel may refer to a matrix of a certain size (e.g., a 3×3 matrix, a 5×5 matrix, a 3×5 matrix, a 5×7 matrix), which may include one or more elements. The kernel may be convolved with an input image, and features may be extracted from the input image. A feature map may be generated after the input image is convolved with the kernel. It should be noted that the numbers for the size of the kernel are merely provided for the purposes of illustration, and not intended to limit the scope of the present disclosure. The kernel(s) may be used in one or more convolution operations of the convolutional neural network. An activation function may refer to a function used for processing the feature map. In some embodiments, the activation function may introduce non-linearity to the feature map. In some embodiments, the preliminary deep learning model may also include a fully connected layer and/or a preliminary weight matrix of the fully connected layer. The fully connected layer may refer to a layer including a certain number of nodes, each node being connected to all nodes in a previous layer. The fully connected layer may include a weight matrix. The weight matrix may represent a connection between each node of the fully connected layer and each node of the previous layer.

In some embodiments, the data acquisition module 402 may acquire the preliminary deep learning model from the storage device 150 and/or the terminal 130 of the imaging system 100. In some embodiments, the data acquisition module 402 may acquire the preliminary deep learning model from the I/O 230 of the computing device 200 via the communication port 240 and/or the I/O 350 of the mobile device 300 via the communication platform 310. In some embodiments, the preliminary deep learning model may be acquired from an external data source connected to the imaging system 100 via the network 120.

In 503, the processing device 140 (e.g., the data acquisition module 402) may acquire one or more sample images. In some embodiments, operation 503 may be performed before operation 501. In some embodiments, the data acquisition module 402 may acquire the sample image(s) based on an intended use of a deep learning model. In some embodiments, the data acquisition module 402 may acquire pre-determined information relating to the sample image(s) based on the intended use of a deep learning model. The pre-determined information relating to the sample image(s) may include a pre-determined ROI of the sample image(s), classification information of the sample image(s), etc. For example, if a deep learning model is intended for image segmentation, the data acquisition module 402 may acquire the sample image(s) including a region of interest (ROI) that has been previously segmented. As another example, if a deep learning model is intended for image classification, the data acquisition module 402 may acquire the sample image(s) including classification information that has been previously determined. In some embodiments, the sample image(s) may include one or more positive sample images and one or more negative sample images. In some embodiments, for image segmentation, a positive sample image may include a properly segmented ROI, while a negative sample image may include no ROI or may include an improperly segmented region. For example, for a rib segmentation, a positive sample image may include a properly segmented rib, while a negative sample image may include no rib or may include a segmented vertebra connected to a rib.

In some embodiments, the data acquisition module 402 may acquire the sample image(s) from the scanner 110, the storage device 150, and/or the terminal 130 of imaging system 100. In some embodiments, the data acquisition module 402 may acquire the sample image(s) from the I/O 230 of the computing device 200 via the communication port 240 and/or the I/O 350 of the mobile device 300 via the communication platform 310. In some embodiments, the data acquisition module 402 may acquire the sample image(s) from an external data source connected to the imaging system 100 via the network 120.

In 505, the processing device 140 (e.g., the sub-image generation unit 502) may generate a plurality of sub-images based on the sample image(s) acquired in 503. In some embodiments, a sub-image may have one or more same portions of a sample image as one or more other sub-images. The same portion(s) shared by two or more sub-images may ensure that every pixel/voxel in the sample image(s) can be involved in the subsequent training process(es). The sub-image generation unit 502 may generate the sub-image(s) based on a determined width of the same portion, a determined number of the sub-images, and/or a determined size of each sub-image. In some embodiments, at least two of the plurality of sub-images may have the same size. In some embodiments, the plurality of sub-images may have the same size. More descriptions of the generation of sub-images may be found elsewhere in the present disclosure (e.g., FIG. 6 and the descriptions thereof).

In 507, the processing device 140 (e.g., the model training unit 504) may train the preliminary deep learning model based on the plurality of sub-images generated in 505 to obtain a trained deep learning model. In some embodiments, one or more operations of the model training unit 504 may be implemented on a GPU of the computing device 200 illustrated in FIG. 2 or the GPU 330 of the mobile device 300 illustrated in FIG. 3. The model training unit 504 may bring the sub-images into the preliminary deep learning model and train the preliminary deep learning model. In some embodiments, the model training unit 504 may perform one or more training processes until all the sub-images are used for training. In some embodiments, the model training unit 504 may generate an updated deep learning model in each training process. For example, the model training unit 504 may bring one or more of the sub-images into the preliminary deep learning model at one time for a first training process to generate a first updated deep learning model, and then the model training unit 504 may bring one or more other sub-images into the first updated deep learning model at one time for a second training process to generate a second updated deep learning model. In some embodiments, one or more iterations of the training process may be performed until all the sub-images are used for training, and a trained deep learning model may be obtained. It should be noted that the number of the training processes is merely provided for the purposes of illustration, and not intended to limit the scope of the present disclosure.

In a training process, the model training unit 504 may process one or more sub-images of the plurality of sub-images in an initial layer of a deep learning model (e.g., the preliminary or updated deep learning model), and the processing result may serve as input data for a next layer of the preliminary or updated deep learning model. The model training unit 504 may process input data of each layer of the preliminary or updated deep learning model obtained from a previous layer. The model training unit 504 may generate an output from a last layer of the preliminary or updated deep learning model. The output generated from the last layer may include one or more updated model parameters relating to the deep learning model, an image generated after a sub-image passes through all layers of the deep learning model, etc. In some embodiments, the model training unit 504 may compare between the predetermined information of the sub-image and the output. In some embodiments, the model training unit 504 may update the model parameters of the preliminary or updated deep learning model based on the result of the comparison to obtain a newly updated deep learning model, so that the newly updated deep learning model may be used to generate an output that is closer to the pre-determined information than a previous deep learning model (e.g., the preliminary or updated deep learning model).

Merely by way of example, a preliminary deep learning model may include a CNN for image segmentation, and the model training unit 504 may perform an exemplary training process illustrated below. One or more model parameters of the CNN may have initial values. The model parameters may include a kernel of each convolution layer, an activation function of each convolution layer, a weight matrix of a fully connected layer. The model training unit 504 may bring a sub-image into the preliminary deep learning model. The sub-image may include a part of an ROI that has been previously segmented from a corresponding sample image. In a convolution layer, the model training unit 504 may perform a convolution operation and a max pooling operation based on the sub-image using the kernel and the activation function of the convolution layer to obtain a feature image corresponding to the sub-image. The model training unit 504 may process the feature image using the weight matrix of the fully connected layer to obtain a segmentation result. The model training unit 504 may determine a difference between the segmentation result and the part of the ROI previously segmented in the sub-image. The model training unit 504 may also update the model parameters of the preliminary deep learning model based on the determined difference. In some embodiments, the model training unit 504 may further update the previously updated deep learning model in a similar way as illustrated above. For example, the model training unit 504 may iterate the exemplary training process for a number of times, so that the plurality of sub-images may be used for training at different times. Accordingly, the model training unit 504 may obtain a trained deep learning model with corresponding updated model parameters. More descriptions of the training process(es) may be found elsewhere in the present disclosure (e.g., FIG. 7 and the descriptions thereof).

Figure 6:
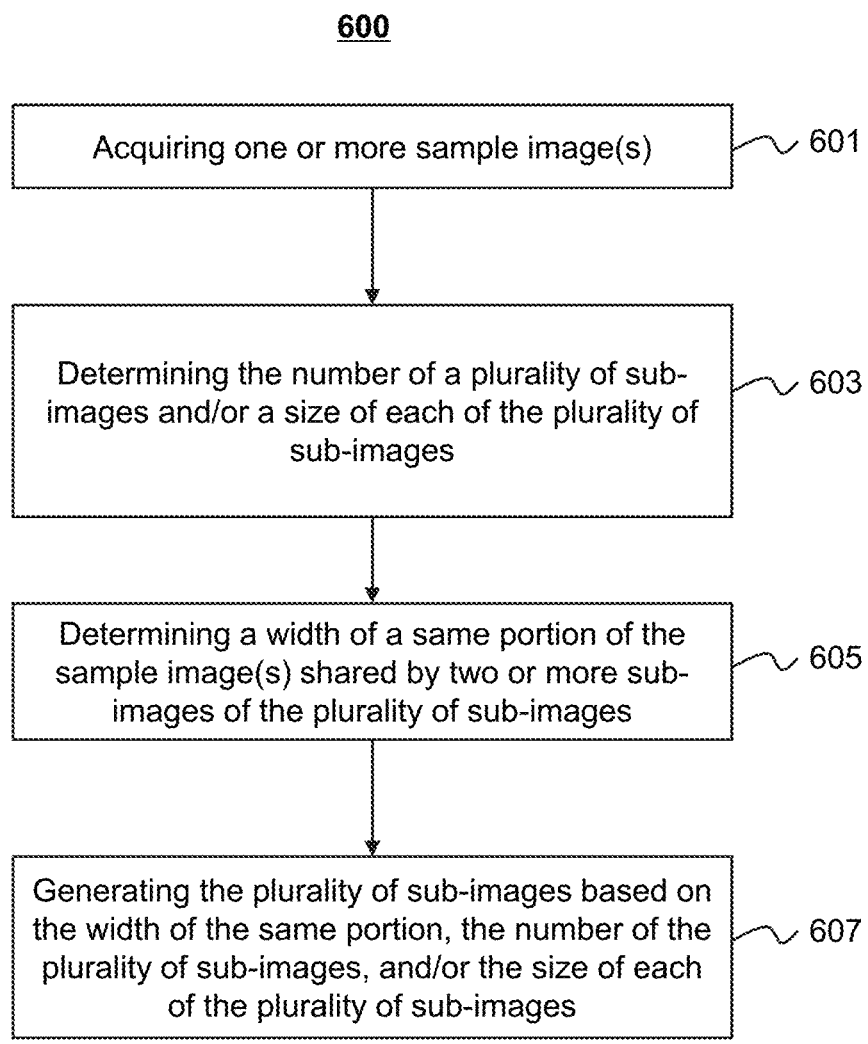
FIG. 6 is a flowchart illustrating an exemplary process for generating a plurality of sub-images based on one or more sample image(s) according to some embodiments of the present disclosure.

FIG. 6 is a flowchart illustrating an exemplary process for generating a plurality of sub-images based on one or more sample image(s) according to some embodiments of the present disclosure. In some embodiments, one or more operations of process 600 illustrated in FIG. 6 for generating a plurality of sub-images may be implemented in the imaging system 100 illustrated in FIG. 1. For example, the process 600 illustrated in FIG. 6 may be stored in the storage device 150 in the form of instructions, and invoked and/or executed by the processing device 140 (e.g., the processor 210 of the computing device 200 as illustrated in FIG. 2, the CPU 340 of the mobile device 300 as illustrated in FIG. 3).

As another example, a portion of the process 600 may be implemented on the scanner 110. In some embodiments, one or more operations of the process 600 may be performed by one or more processors inside and/or outside of the imaging system 100. In some embodiments, operation 505 illustrated in FIG. 5B may be performed according to the process 600. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting.

In 601, the processing device 140 (e.g., the data acquisition module 402) may acquire one or more sample image(s). The operation 601 for acquiring sample image(s) may be performed according to operation 503 and is not repeated herein. In some embodiments, the sample image(s) acquired in 503 may be used in one or more of the following operations, and thus, operation 601 may be omitted.

In 603, the processing device 140 (e.g., the sub-image generation unit 502) may determine the number of a plurality of sub-images and/or a size of each of the plurality of sub-images. In some embodiments, the sub-image generation unit 502 may determine the number of the plurality of sub-images and/or the size of each of the plurality of sub-images according to a default setting of the imaging system 100 or preset by a user or operator via the terminals 130. In some embodiments, the sub-image generation unit 502 may determine the number of the plurality of sub-images and/or the size of each of the plurality of sub-images based on a size of the sample image(s) and/or available memory space of a graphics processing unit (GPU) (e.g., a GPU in the processor 210, the GPU 330). A GPU may refer to a processor designed to perform one or more graphics operations. In some embodiments, a graphics operation may include a convolution operation (i.e., multiple matrix multiplication) based on an image (e.g., a sub-image) and a kernel. More descriptions of the GPU may be found elsewhere in the present disclosure (e.g., FIGS. 2-3 and the descriptions thereof).

In some embodiments, the GPU may not be able to process a sample image with a relatively large size at one time, and thus, the GPU may not realize the training of a deep learning model. In some embodiments, the relatively large size may refer to a size close to or larger than available memory space of the GPU. Therefore, the sample image(s) may need to be downscaled to facilitate the processing in the GPU. In some embodiments, the sub-image generation unit 502 may generate a plurality of sub-images based on the sample image(s). Each of the plurality of sub-images may have a suitable size for being processed in the GPU. In some embodiments, the sub-image generation unit 502 may determine a size range of the sub-image(s) that are suitable for being processed in the GPU based on the available memory space of the GPU. Each of the sub-images may have a size within the size range. In some embodiments, the sub-image generation unit 502 may determine a size threshold based on the available memory space of the GPU. The size threshold may be the highest image size for a sub-image that is suitable for being processed in the GPU. The size threshold may have a value related to a percentage of the available memory space of the GPU. For example, the percentage may be 10%, 20%, 30%, 40%, 50%, 60%, 70%, 80%, 90%, or the like. In some embodiments, the size threshold, the size range, and/or the percentage may be determined based on default values. In some embodiments, the default values may be determined by the imaging system 100 or may be preset by a user or operator via the terminal(s) 130. In some embodiments, the sub-image generation unit 502 may determine a size of each of the sub-images based on the size range and/or the size threshold. It should be noted that in some embodiments, an upper limit of the size range may be no more than the available memory space of the GPU. In some embodiments, a lower limit of the size range may be a preset value or a preset percentage of the available memory space of the GPU to improve the utilization of the available memory space of the GPU.

In some embodiments, the sub-image generation unit 502 may determine the number of sub-images based on a quotient of the size of a sample image divided by the size threshold. The number of sub-images may be an integer larger than 1. For example, if the quotient of the size of the sample image divided by the size threshold is an integer, the number of sub-images may be determined as the integer. If the quotient of the size of the sample image divided by the size threshold is a decimal, the number of sub-images may be determined as the integer part of the decimal plus one. In some embodiments, the plurality of sub-images may have the same size and/or the same shape. In some embodiments, the plurality of sub-images may have various sizes and/or various shapes, and the size of each sub-image may be within the size range or no more than the size threshold. A sub-image may have a shape of a rectangle, a square, a circle, a triangle, etc. In some embodiments, a sub-image may have the same portion of the sample image(s) as one or more other sub-images. For example, two sub-images may partially overlap with each other. As another example, the plurality of sub-images may include a first sub-image, a second sub-image, and a third sub-image, in which each of the first sub-image and the second sub-image may include a first portion (or a first same portion) of a sample image, and each of the first sub-image and the third sub-image may include a second portion (or a second same portion) of the sample image. According to the characteristics of a convolution operation, information relating to a sub-image edge may be lost in one or more convolution operations. The same portion shared by two or more sub-images may ensure that every pixel/voxel in the sample image(s) can be involved in the training process, and thus information loss related to the sample image(s) may be avoided in the training process.

In 605, the processing device 140 (e.g., the sub-image generation unit 502) may determine a width of the same portion of the sample image(s) shared by two or more sub-images (e.g., two adjacent sub-images) of the plurality of sub-images. In some embodiments, the sub-image generation unit 502 may determine the width of the same portion based on the model parameters of a deep learning model (e.g., the preliminary deep learning model acquired in 501, an updated deep learning model) to be trained in one or more training processes. In some embodiments, the deep learning model may include one or more kernels, as described in operations 501 and 507, and the sub-image generation unit 502 may determine the width of the same portion based on a size of the one or more kernels.

In some embodiments, the sub-image generation unit 502 may determine the number of pixels or voxels corresponding to the width of the same portion as no less than a reference value R. In some embodiments, there may be only one kernel in the deep learning model, and information relating to pixels/voxels of a sub-image may be lost during convolution, in which the pixels/voxels may have a width of about half of the width of the kernel W (i.e., $(W-1)/2$). The reference value R may be equal to a width of the kernel W subtracting 1 (i.e., R=W−1), so that every pixel/voxel in the sample image(s) can be involved in the training process, and information loss may be avoided. For example, if a kernel in a preliminary deep learning model is represented by a 5×5 matrix, the sub-image generation unit 502 may determine the number of pixels or voxels corresponding to the width of the same portion as no less than (5−1), i.e., 4. In this way, even if each of two or more sub-images sharing the same portion loses information corresponding to pixels/voxels with a width of (W−1)/2 when being processed by the kernel, only data of the same portion may be lost, and data of the whole sample image(s) may be kept completely for further training.

In some embodiments, there may be a plurality of down sampling layers (also referred to as pooling layers in some instance) in the deep learning model, and each down sampling layer may include one or more kernels. A down sampling layer may also be referred to as a pooling layer or a sub-sampling layer, which may down sample an output from a previous layer of the deep learning model (e.g., down sample a set of pixels/voxels into one value). The reference value R may relate to the widths of the one or more kernels and/or the number of the down sampling layers that includes the one or more kernels. In some embodiments, the reference value R can be determined as Equation (1):

$$\begin{cases} R = 2S_N, & N = 1 \\ R = 2S_1(1 + P_1), & N > 1 \end{cases} \quad (1)$$

where $P_i=S_{i+1}(1+P_{i+1})$, i is an integer larger than 1 (e.g., 1, 2, ..., N−2), N is the number of the down sampling layers that includes one or more kernels, the $N^{th}$ layer is the output layer, $P_{N-1}=S_N$, $S_j=(W_j-1)/2$, j is an integer larger than 1 (e.g., 1, 2, ..., N), and $W_j$ denotes the maximum width of the kernel(s) in the $j^{th}$ layer.

Figure 8A:
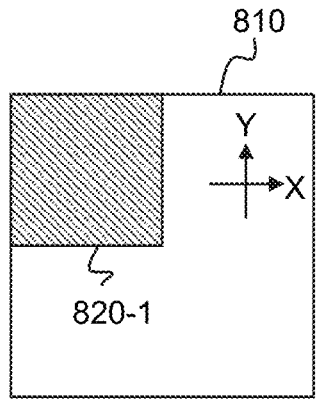
FIGS. 8A-8I are schematic diagrams illustrating a plurality of exemplary sub-images of a 2D sample image according to some embodiments of the present disclosure.
Figure 8B:
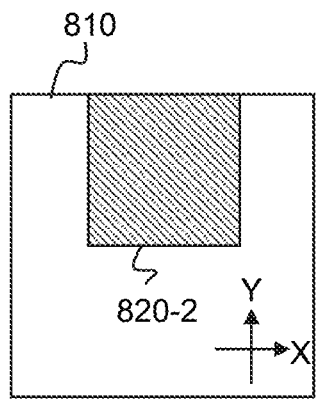
Figure 8C:
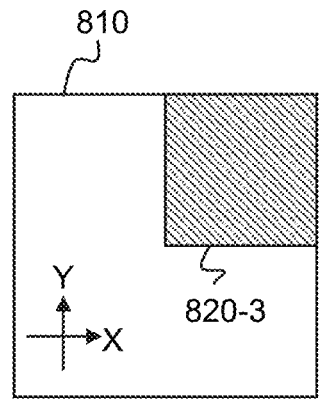
Figure 8D:
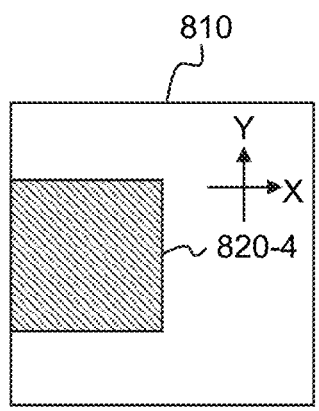
Figure 8E:
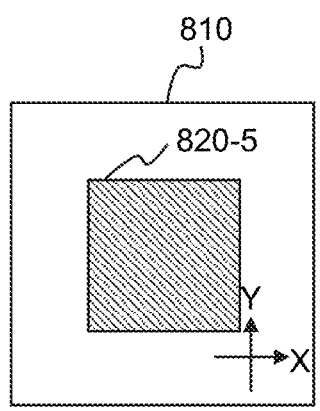
Figure 8F:
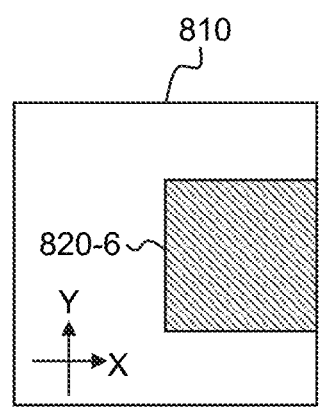
Figure 8G:
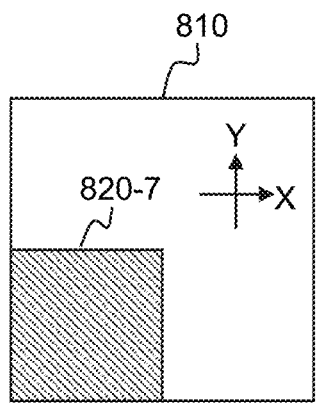
Figure 8H:
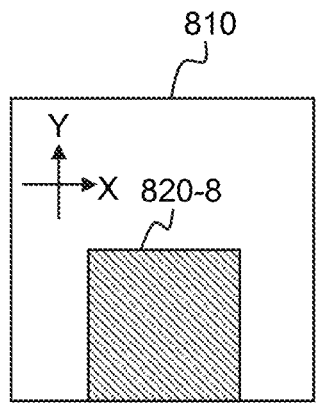
Figure 8I:
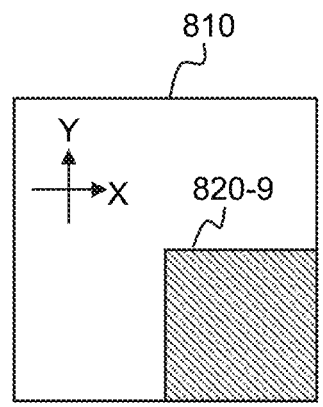

It should be noted that a first same portion of a sample image shared by two sub-images and a second same portion of the sample image shared by other two sub-images may be the same or different. More descriptions of the same portion of the sub-images may be found elsewhere in the present disclosure (e.g., FIGS. 8A-8B and the descriptions thereof).

In 607, the processing device 140 (e.g., the sub-image generation unit 502) may generate the plurality of sub-images based on the width of the same portion, the number of the plurality of sub-images, and/or the size of each of the plurality of sub-images. In some embodiments, the sub-image generation unit 502 may generate a plurality of preliminary sub-images by dividing a sample image based on the number of the plurality of sub-images and/or the size of each of the plurality of sub-images. In some embodiments, the sub-image generation unit 502 may expand one or more edges of the preliminary sub-images based on the width of the same portion. For example, the sub-image generation unit 502 may expand an edge of a preliminary sub-image for R/2 pixels/voxels, so that the width of the same portion shared by two adjacent sub-images may be no less than R. In some embodiments, the sub-image generation unit 502 may expand the preliminary sub-images located at an edge of a sample image for R/2 pixels/voxels based on one or more pixels/voxels of the edge of the sample image. In some embodiments, the sub-image generation unit 502 may generate the plurality of sub-images in a sequence from left to right, top to bottom. For example, the sub-image generation unit 502 may generate a 1st sub-image with a first size at a top left corner of a sample image, and a 2nd sub-image with a second size adjacent to the 1st sub-image; the sub-image generation unit 502 may determine the range and/or location of the 2nd sub-image based on the first size and the second size, so that a shared portion of the 1st sub-image and the 2nd sub-image may have a width no less than R.

Each sub-image may have a size suitable for being processed in the GPU. Each sub-image may have the same portion of the sample image(s) as one or more other sub-images. In some embodiments, two or more of the sub-images may have the same size. In some embodiments, the sub-images may have different sizes. In some embodiments, the sub-image generation unit 502 may transmit the generated sub-images to a storage device (e.g., the storage device 150) for storing, and thus, the sub-images may be used in one or more further training processes.

In some embodiments, the processing device 140 (e.g., the sub-image generation unit 502) may perform a data extension operation or data filling operation on the sample image in one or more directions to obtain extended data. The direction(s) may relate to the dimension of the sample image. For example, if the sample image is a two-dimensional image (e.g., an image in an X-Y plane), the data filling operation may be performed along an X axis direction and/or a Y axis direction. As another example, if the sample image is a three-dimensional image (e.g., an image in an X-Y-Z space), the data filling operation may be performed along an X axis direction, a Y axis direction, and/or a Z axis direction. A width of pixels/voxels corresponding to the extended or filled data may be no less than half of the reference value R.

In some embodiments, the data extension or filling of the sample image may be performed before the sub-images are generated. The processing device 140 may fill or extend the sample image towards the outside of the sample image. For example, the processing device 140 may fill or extend the sample image along the positive direction of X axis, the positive direction of Y axis, the negative direction of X axis, and/or the negative direction of Y axis.

In some embodiments, the data extension or filling of the sample image may be performed after the sub-images are generated. For example, the processing device 140 may fill or extend one or more sub-images located at a margin of the sample image (e.g, as shown in FIGS. 8A-8D and 8F-8I, the sub-image 820-1, the sub-image 820-2, the sub-image 820-3, the sub-image 820-4, the sub-image 820-6, the sub-image 820-7, the sub-image 820-8, and the sub-image 820-9). The processing device 140 may fill or extend the sub-images towards the outside of the sample image. For example, the processing device 140 may fill or extend the sub-image 820-1 along the negative direction of X axis and the positive direction of Y axis; the processing device 140 may fill or extend the sub-image 820-2 along the positive direction of Y axis; the processing device 140 may fill or extend the sub-image 820-3 along the positive direction of X axis and the positive direction of Y axis; the processing device 140 may fill or extend the sub-image 820-4 along the negative direction of X axis; the processing device 140 may fill or extend the sub-image 820-6 along the positive direction of X axis; the processing device 140 may fill or extend the sub-image 820-7 along the negative direction of X axis and the negative direction of Y axis; the processing device 140 may fill or extend the sub-image 820-8 along the negative direction of Y axis; and the processing device 140 may fill or extend the sub-image 820-9 along the positive direction of X axis and the negative direction of Y axis. The width of the pixels/voxels corresponding to the extended or filled data may be no less than R/2 to ensure an avoidance of information loss during convolution.

In some embodiments, the extended or filled data may be determined by the imaging system 100 or a user, or obtained based on pixels/voxels of the sample image. For example, the extended or filled data may be 0. As another example, the extended or filled data may be the same as those of pixels/voxels located at the margin of the sample image. As still another example, the extended or filled data may be obtained based on a weighed calculation and/or exponential attenuation of one or more pixels/voxels of the sample image.

It should be noted that the above description of process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 605 may be performed before or simultaneously with operation 603. As another example, the sample image(s) may be 3D image(s), the kernel(s) of the preliminary deep learning model may be 3D kernel(s), and the same portion(s) of the sample image(s) may also be 3D portion(s). As a further example, a 3D size of the same portion of a 3D image shared by two or more sub-images may be determined based on a 3D size of the kernel(s).

Figure 7:
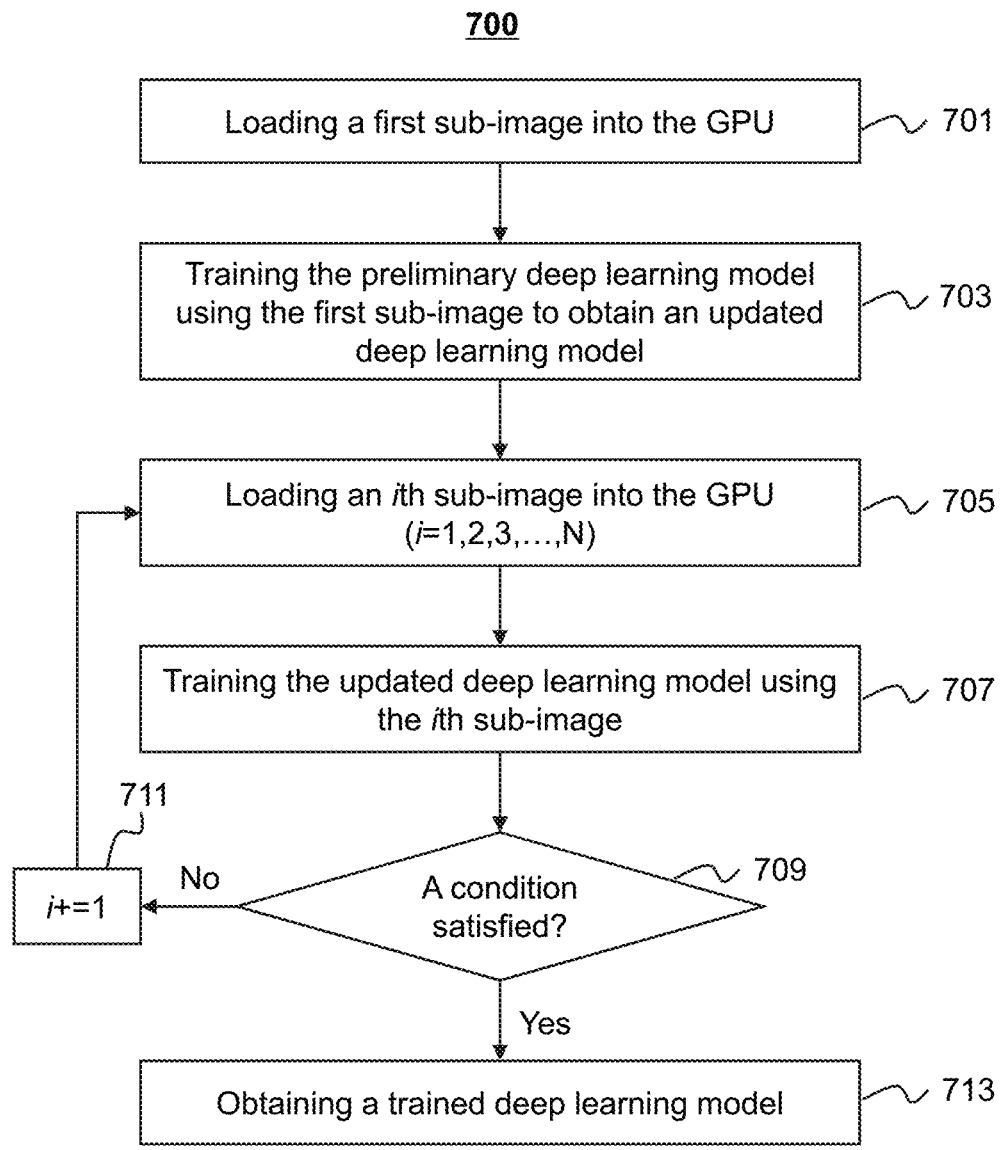
FIG. 7 is a flowchart illustrating an exemplary process for training a preliminary deep learning model according to some embodiments of the present disclosure.

FIG. 7 is a flowchart illustrating an exemplary process for training a preliminary deep learning model according to some embodiments of the present disclosure. In some embodiments, one or more operations of process 700 illustrated in FIG. 7 for training a preliminary deep learning model may be implemented in the imaging system 100 illustrated in FIG. 1. For example, the process 700 illustrated in FIG. 7 may be stored in the storage device 150 in the form of instructions, and invoked and/or executed by the processing device 140 (e.g., the processor 210 of the computing device 200 as illustrated in FIG. 2, the CPU 340 of the mobile device 300 as illustrated in FIG. 3). As another example, a portion of the process 700 may be implemented on the scanner 110. In some embodiments, one or more operations of the process 700 may be performed by one or more processors inside and/or outside of the imaging system 100. In some embodiments, operation 507 illustrated in FIG. 5 may be performed according to the process 700. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 7 and described below is not intended to be limiting.

In 701, the processing device 140 (e.g., the model training unit 504) may load a first sub-image into the GPU (e.g., a GPU in the processor 210, the GPU 330). In some embodiments, the first sub-image may be randomly selected from a plurality of sub-images. In some embodiments, the first sub-image may be selected based on a preset rule. The preset rule may relate to an order of the plurality of sub-images. The model training unit 504 may determine the order of the plurality of sub-images based on position information of the sub-images. For example, the model training unit 504 may determine a sub-image at a top left corner of a sample image as the 1st sub-image and may determine the residual sub-images in order from left to right, top to bottom as the 2nd sub-image, the 3rd sub-image, the Nth sub-image, etc. The number N may be an integer larger than 1. In some embodiments, the model training unit 504 may determine the 1st sub-image as the first sub-image to be loaded into the GPU. It should be noted that the 1st sub-image may not necessarily be the first sub-image to be loaded into the GPU, and the Nth sub-image may not necessarily be the last sub-image to be loaded into the GPU. A sequential number of the sub-images (e.g., 1, 2, 3, ..., N) may not necessarily represent the order of the generation of the sub-images or the order of the loading of the sub-images into the GPU. In some embodiments, the plurality of sub-images may be stored in a storage device (e.g., the storage device 150), and the model training unit 504 may load the first sub-image from the storage device into the GPU. In some embodiments, the model training unit 504 may load the first sub-image directly from the sub-image generation unit 502 into the GPU.

In 703, the processing device 140 (e.g., the model training unit 504) may train the preliminary deep learning model using the first sub-image to obtain an updated deep learning model. The training of the preliminary deep learning model may correspond to those described in operation 507. In some embodiments, the preliminary deep learning model may include one or more CNNs. One or more model parameters of the CNN may have initial values. The model parameters may include a kernel of each convolution layer, an activation function of each convolution layer, and/or a weight matrix of a fully connected layer. The model training unit 504 may bring the first sub-image into the preliminary deep learning model. The first sub-image may include a part of an ROI which has been previously segmented from a corresponding sample image. In a convolution layer, the model training unit 504 may perform a convolution operation and a max pooling operation based on the first sub-image using the kernel and the activation function of the convolution layer to obtain a feature image corresponding to the first sub-image. The model training unit 504 may process the feature image based on the weight matrix of the fully connected layer to obtain a segmentation result. The model training unit 504 may determine a difference between the segmentation result and the part of the ROI previously segmented in the first sub-image. Then the model training unit 504 may update the model parameters of the preliminary deep learning model based on the difference to obtain the updated deep learning model.

In 705, the processing device 140 (e.g., the model training unit 504) may load an ith sub-image into the GPU. The number i may represent a current iteration count. The number i may be an integer larger than 0. For example, i may be 1, 2, 3, 4, 5, ..., N. The number N may represent the number of the sub-images to be used in the training process. In some embodiments, i may have an initial value, for example, 1, 2, or the like. In some embodiments, the model training unit 504 may select the ith sub-image randomly from one or more residual sub-images (i.e., the one or more sub-image(s) excluding the sub-image(s) that has already been loaded into the GPU for training). In some embodiments, the model training unit 504 may select the ith sub-image based on a sequential number of the plurality of sub-images, as described in operation 701. In some embodiments, the model training unit 504 may load the ith sub-image from a storage device (e.g., the storage device 150) into the GPU. In some embodiments, the model training unit 504 may load the ith sub-image directly from the sub-image generation unit 502 into the GPU.

In 707, the processing device 140 (e.g., the model training unit 504) may train the updated deep learning model determined in 703 using the ith sub-image. The training process of the updated deep learning model may correspond to that of the preliminary deep learning model described in 703 and is not repeated herein. The model parameters may be updated again in 707.

In some embodiments, the process 700 may include a plurality of iterations. For example, in each iteration, the processing device 140 (e.g., the model training unit 504) may determine whether a condition is satisfied in 709. The condition may relate to an iteration count representing the number of iterations that have been performed, a degree of change in model parameters updated in a current iteration comparing with those updated in a previous iteration, a difference between the segmentation result generated using the currently updated deep learning model and a part of an ROI previously segmented in the sample image, or the like, or any combination thereof. In response to a determination that the condition is satisfied (e.g., the iteration count is no less than a first threshold, or the degree of change in model parameters between successive iterations is no more than a second threshold, or the difference between the segmentation result and a part of an ROI is no more than a third threshold), the process 700 may proceed to 713; otherwise, the process 700 may proceed to 711.

In 711, the processing device 140 (e.g., the model training unit 504) may update the number i by adding one to i. Then the process 700 may return to 705, and the model training unit 504 may perform the next iteration.

In 713, the processing device 140 (e.g., the model training unit 504) may obtain the trained deep learning model. In some embodiments, the model training unit 504 may designate the last updated deep learning model as the trained deep learning model. In some embodiments, the model training unit 504 may adjust one or more model parameters of the last updated deep learning model, and designate the adjusted deep learning model as the trained deep learning model.

FIGS. 8A-8I are schematic diagrams illustrating a plurality of exemplary sub-images of a 2D sample image 810 according to some embodiments of the present disclosure. The 2D sample image 810 may have a relatively large size close to or larger than the available memory space of a GPU in which a deep learning model is to be trained. The plurality of sub-images 820 may include complete information of the sample image 810. A sub-image 820-$n$ (n=1, 2, . . . , 9) may be represented by a shaded part in the 2D sample image 810. Each sub-image 820-$n$ may have a size suitable for being processed in the GPU. In some embodiments, the plurality of sub-images 820 may have the same size. In some embodiments, each sub-image 820-$n$ may have a same portion of the 2D sample image 810 as one or more other sub-images. For example, the sub-image 820-1 may have a first same portion of the 2D sample image 810 as the sub-image 820-2. As another example, the sub-image 820-1 may have a second same portion of the 2D sample image 810 as the sub-image 820-4.

Figure 9:
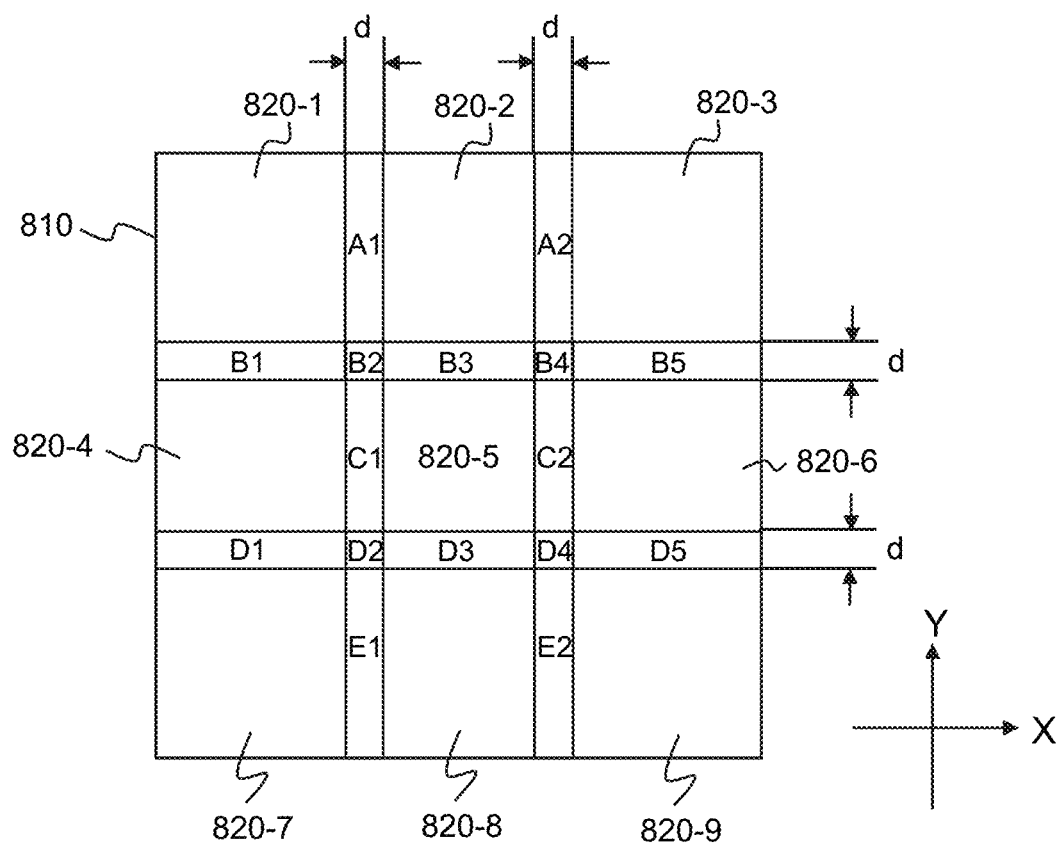
FIG. 9 is a schematic diagram illustrating same exemplary portions of a plurality of sub-images of a 2D sample image according to some embodiments of the present disclosure.

FIG. 9 is a schematic diagram illustrating same exemplary portions of a plurality of sub-images 820 of a 2D sample image 810 according to some embodiments of the present disclosure. As illustrated in FIG. 9, the same portion A1 may be shared by the sub-images 820-1 and 820-2. The same portion A2 may be shared by the sub-images 820-2 and 820-3. The same portion B1 may be shared by the sub-images 820-1 and 820-4. The same portion B2 may be shared by the sub-images 820-1, 820-2, 820-4, and 820-5. The same portion B3 may be shared by the sub-images 820-2 and 820-5. The same portion B4 may be shared by the sub-images 820-2, 820-3, 820-5, and 820-6. The same portion B5 may be shared by the sub-images 820-3 and 820-6. The same portion C1 may be shared by the sub-images 820-4 and 820-5. The same portion C2 may be shared by the sub-images 820-5 and 820-6. The same portion D1 may be shared by the sub-images 820-4 and 820-7. The same portion D2 may be shared by the sub-images 820-4, 820-5, 820-7, and 820-8. The same portion D3 may be shared by the sub-images 820-5 and 820-8. The same portion D4 may be shared by the sub-images 820-5, 820-6, 820-8, and 820-9. The same portion D5 may be shared by the sub-images 820-6 and 820-9. The same portion E1 may be shared by the sub-images 820-7 and 820-8. The same portion E2 may be shared by the sub-images 820-8 and 820-9.

According to the characteristics of a convolution operation, information relating to a sub-image edge may be lost. The same portions (e.g., the same portions A1-A2, B1-B5, C1-C2, D1-D5, and E1-E2) may ensure that every pixel/voxel in the 2D sample image 810 can be involved in a training process, and thus information loss related to the 2D sample image 810 may be avoided in the training process. In some embodiments, the same portions may have the same width d. In some embodiments, the same portions may have different widths (not shown). The width of the same portions may be determined based on model parameters of a deep learning model to be trained. The deep learning model may include one or more kernels. In some embodiments, the width of the same portions may be determined based on a size of the one or more kernels. In some embodiments, the number of pixels or voxels corresponding to the width of the same portion may be determined as no less than a reference value R. The reference value R may be equal to a width of the kernel(s) W subtracting 1 (i.e., R=W−1). For example, if a kernel in the deep learning model is represented by a 5×5 matrix, the number of pixels or voxels corresponding to the width of the same portion may be determined as no less than (5−1), i.e., 4. A coordinate system including an X axis and a Y axis is also illustrated in FIG. 9 to show different directions of the sample image and the sub-images.

Figures 10A, 10B:
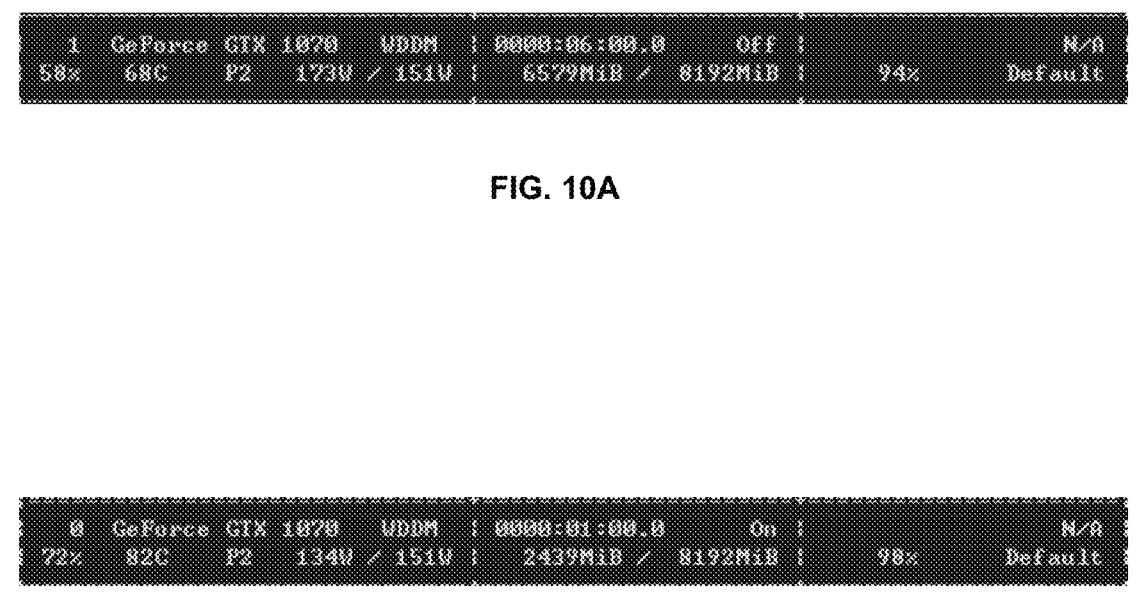

FIGS. 10A and 10B are diagrams illustrating exemplary hardware test information relating to a GPU according to some embodiments of the present disclosure. A deep learning model including a CNN (e.g., Vnet (fully convolutional neural networks for volumetric medical image segmentation)) is to be trained in a training process. The training process is to be performed in a GPU (NVIDIA GeForce GTX 1070) with available memory space of 8192 MB. The GPU is driven by a windows display driver model (WDDM). As illustrated in FIG. 10A, after a sub-image with a resolution of 1024×1024 was loaded into the GPU for training, a memory space of 6579 MB of the GPU was occupied. The GPU illustrated in FIG. 10A had a GPU ID 1, and the illustrated GPU fan speed was 58%. The GPU temperature was 68° C. The power usage of the GPU was 173 W, and the power capability of the GPU was 151 W. The GPU performance state was P2. The volatile GPU utilization was 94%. As illustrated in FIG. 10B, after a sub-image with a resolution of 512×512, was loaded into the GPU for training, a memory space of 2439 Mb of the GPU was occupied. The GPU illustrated in FIG. 10B had a GPU ID 0, and the illustrated GPU fan speed was 72%. The GPU temperature was 82° C. The power usage of the GPU was 134 W, and the power capability of the GPU was 151 W. The GPU performance state was P2. The volatile GPU utilization was 98%. It should be noted that a sub-image with a smaller size may occupy less memory space of the GPU, and the performance of the GPU may be improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system comprising:
   at least one processor; and
   a storage medium configured to store instructions, wherein when executing the instructions, the at least one processor is configured to cause the system to:
   determine a trained deep learning model;
   acquire an input image; and
   use the trained deep learning model to process the input image to generate a processed image,
   wherein the trained deep learning model is obtained by:
   acquiring a preliminary deep learning model;
   acquiring a sample image;
   generating a plurality of sub-images based on the sample image; and
   training the preliminary deep learning model based on the plurality of sub-images to obtain the trained deep learning model;
   wherein at least two of the plurality of sub-images share a same portion of the sample image:
   wherein the plurality of sub-images is generated by
   determining a width of the same portion of the sample image:
   determining a size of each of the plurality of sub-images or the number of the sub-images; and
   generating the plurality of sub-images based on the width of the same portion and at least one of the size of each of the plurality of sub-images or the number of the sub-images; and
   wherein the width of the same portion of the sample image is determined by determining the number of pixels or voxels corresponding to the width of the same portion of the sample image as no less than a reference value R, the reference value R being related to at least one of a width of the at least one kernel or the number of at least one down sampling layer that includes the at least one kernel.

2. The system of claim 1, wherein the preliminary deep learning model includes at least one convolutional neural network (CNN), the at least one CNN including at least one kernel, and wherein the determining a width of the same portion comprising:
   determining the width of the same portion of the sample image based on a size of the at least one kernel.

3. The system of claim 1, wherein the generating the plurality of sub-images based on the sample image further comprises:
   performing a data extension on the sample image or one or more of the plurality of sub-images along one or more directions to obtain extended data, a width of pixels/voxels corresponding to the extended data being no less than half of the reference value R.

4. The system of claim 1, wherein the reference value R is determined as:

$$\begin{cases} R = 2S_N, & N = 1 \\ R = 2S_1(1 + P_1), & N > 1 \end{cases}$$

and wherein $P_i$ is equal to $S_{i+1}(1+P_{i+1})$, i is an integer larger than 1, N is the number of the down sampling layers that includes one or more kernels, the $N^{th}$ layer is the output layer, $P_{N-1}$ is equal to $S_N$, $S_i$ is equal to $(W_j-1)/2$, j is an integer larger than 1, and $W_j$ denotes the maximum width of the kernel(s) in the $j^{th}$ layer.

5. The system of claim 1, wherein:
   the plurality of sub-images includes a first sub-image, a second sub-image, and a third sub-image;
   the first sub-image and the second sub-image share a first same portion; and
   the first sub-image and the third sub-image share a second same portion.

6. The system of claim 5, wherein the first same portion has a first width same to a second width of the second same portion.

7. The system of claim 1, wherein the training the preliminary deep learning model comprises training the preliminary deep learning model by a graphic processing unit (GPU).

8. The system of claim 7, wherein the training the preliminary deep learning model by a GPU comprising:
   loading a first sub-image into the GPU;
   training the preliminary deep learning model using the first sub-image to obtain an updated deep learning model;
   loading a second sub-image into the GPU; and
   training the updated deep learning model using the second sub-image to obtain a trained deep learning model.

9. The system of claim 7, wherein the determining a size of each of the plurality of sub-images or the number of the sub-images comprises:
   determining the size of each of the plurality of sub-images or the number of the sub-images based on a size of the sample image and available memory space of the GPU.

10. The system of claim 1, wherein:
    the processing the input image based on the trained deep learning model including segmenting the input image; and
    the processing result includes a segmented image based on the segmentation.

11. The system of claim 1, wherein at least two of the plurality of sub-images have a same size.

12. The system of claim 1, wherein the plurality of sub-images has a same size.

13. A method implemented on at least one machine each of which has at least one processor and one storage medium, the method comprising:
    determining a trained deep learning model;
    acquiring an input image; and
    using the trained deep learning model to process the input image to generate a processed image,
    wherein the trained deep learning model is obtained by:
    acquiring a preliminary deep learning model;
    acquiring a sample image;
    generating a plurality of sub-images based on the sample image; and
    training the preliminary deep learning model based on the plurality of sub-images to obtain the trained deep learning model;
    wherein at least two of the plurality of sub-images share a same portion of the sample image;

wherein the plurality of sub-images is generated by
  determining a width of the same portion of the sample image;
  determining a size of each of the plurality of sub-images or the number of the sub-images; and
  generating the plurality of sub-images based on the width of the same portion and at least one of the size of each of the plurality of sub-images or the number of the sub-images; and
wherein the width of the same portion of the sample image is determined by determining the number of pixels or voxels corresponding to the width of the same portion of the sample image as no less than a reference value R, the reference value R being related to at least one of a width of the at least one kernel or the number of at least one down sampling layer that includes the at least one kernel.

14. A non-transitory computer readable medium storing instructions, the instructions when executed by at least one processor, causing the at least one processor to implement a method comprising:
  determining a trained deep learning model;
  acquiring an input image; and
  using the trained deep learning model to process the input image to generate a processed image,
  wherein the trained deep learning model is obtained according to a process, the process including:
  acquiring a preliminary deep learning model;
  acquiring a sample image;
  generating a plurality of sub-images based on the sample image; and
  training the preliminary deep learning model based on the plurality of sub-images to obtain the trained deep learning model;
  wherein at least two of the plurality of sub-images share a same portion of the sample image;
  wherein the plurality of sub-images is generated by
    determining a width of the same portion of the sample image;
    determining a size of each of the plurality of sub-images or the number of the sub-images; and
    generating the plurality of sub-images based on the width of the same portion and at least one of the size of each of the plurality of sub-images or the number of the sub-images: and
  wherein the width of the same portion of the sample image is determined by determining the number of pixels or voxels corresponding to the width of the same portion of the sample image as no less than a reference value R, the reference value R being related to at least one of a width of the at least one kernel or the number of at least one down sampling layer that includes the at least one kernel.

15. The method of claim 13, wherein the preliminary deep learning model includes at least one convolutional neural network (CNN), the at least one CNN including at least one kernel,
  wherein the determining a width of the same portion comprising determining the width of the same portion of the sample image based on a size of the at least one kernel, and
  wherein the reference value R is determined as:

$$\begin{cases} R = 2S_N, & N = 1 \\ R = 2S_1(1+P_1), & N > 1 \end{cases}$$

and wherein $P_i$ is equal to $S_{i+1}(1+P_{i+1})$, i is an integer larger than 1 N is the number of the down sampling layers that includes one or more kernels, the $N^{th}$ layer is the output layer, $P_{N-1}$ is equal to $S_N$, $S_j$ is equal to $(W_j-1)/2$, j is an integer larger than 1, and $W_j$ denotes the maximum width of the kernel(s) in the $j^{th}$ layer.

16. The method of claim 13, wherein:
  the plurality of sub-images includes a first sub-image, a second sub-image, and a third sub-image:
  the first sub-image and the second sub-image share a first same portion; and
  the first sub-image and the third sub-image share a second same portion; and
  wherein the determining a width of the same portion of the sample image comprising determining the number of pixels or voxels corresponding to the width of the same portion of the sample image as no less than a reference value FR, the reference value R being related to at least one of a width of the at least one kernel or the number of at least one down sampling layer that includes the at least one kernel.

17. The method of claim 13, wherein the training the preliminary deep learning model comprises training the preliminary deep learning model by a graphic processing unit (GPU),
  wherein the training the preliminary deep learning model by a GPU comprising:
    loading a first sub-image into the GPU:
    training the preliminary deep learning model using the first sub-image to obtain an updated deep learning model;
    loading a second sub-image into the GPU; and
    training the updated deep learning model using the second sub-image to obtain a trained deep learning model, and
  wherein the determining a size of each of the plurality of sub-images or the number of the sub-images comprises determining the size of each of the plurality of sub-images or the number of the sub-images based on a size of the sample image and available memory space of the GPU.

18. The computer readable medium of claim 14, wherein the preliminary deep learning model includes at least one convolutional neural network (CNN), the at least one CNN including at least one kernel,
  wherein the determining a width of the same portion comprising determining the width of the same portion of the sample image based on a size of the at least one kernel, and
  wherein the reference value R is determined as:

$$\begin{cases} R = 2S_N, & N = 1 \\ R = 2S_1(1+P_1), & N > 1 \end{cases}$$

and wherein $P_i$ is equal to $S_{i+1}(1+P_{i+1})$, i is an integer larger than 1, N is the number of the down sampling layers that includes one or more kernels, the $N^{th}$ layer is the output layer, $P_{N-1}$ is equal to $S_N$, $S_i$ is equal to $(W_j-1)/2$, j is an integer larger than 1, and $W_j$ denotes the maximum width of the kernel(s) in the $j^{th}$ layer.

19. The computer readable medium of claim 14, wherein:
  the plurality of sub-images includes a first sub-image, a second sub-image, and a third sub-image;
  the first sub-image and the second sub-image share a first same portion; and the first sub-image and the third sub-image share a second same portion: and wherein the determining a width of the same portion of the sample image comprising determining the number of pixels or voxels corresponding to the width of the same portion of the sample image as no less than a reference value R, the reference value R being related to at least one of a width of the at least one kernel or the number of at least one down sampling layer that includes the at least one kernel.

20. The computer readable medium of claim 14, wherein the training the preliminary deep learning model comprises training the preliminary deep learning model by a graphic processing unit (GPU), wherein the training the preliminary deep learning model by a GPU comprising:

loading a first sub-image into the GPU;

training the preliminary deep learning model using the first sub-image to obtain an updated deep learning model;

loading a second sub-image into the GPU; and training the updated deep learning model using the second sub-image to obtain a trained deep learning model, and wherein the determining a size of each of the plurality of sub-images or the number of the sub-images comprises determining the size of each of the plurality of sub-images or the number of the sub-images based on a size of the sample image and available memory space of the GPU.

* * * * *